(12) United States Patent
Pieczul et al.

(10) Patent No.: US 9,712,523 B2
(45) Date of Patent: *Jul. 18, 2017

(54) SECURE TRANSFER OF WEB APPLICATION CLIENT PERSISTENT STATE INFORMATION INTO A NEW DOMAIN

(71) Applicant: International Business Machines Corporation, Armonk, NY (US)

(72) Inventors: Olgierd S. Pieczul, Dublin (IE); Mariusz Pajecki, Dublin (IE); Izabela Pogorzelska-Pieczul, Dublin (IE); Mustansir Banatwala, Hudson, NH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/344,650

(22) Filed: Nov. 7, 2016

(65) Prior Publication Data

US 2017/0054706 A1    Feb. 23, 2017

Related U.S. Application Data

(63) Continuation of application No. 14/834,047, filed on Aug. 24, 2015, now Pat. No. 9,509,691, which is a (Continued)

(51) Int. Cl.
H04L 29/06 (2006.01)
H04L 29/08 (2006.01)

(52) U.S. Cl.
CPC ........ *H04L 63/083* (2013.01); *H04L 63/0876* (2013.01); *H04L 63/166* (2013.01); *H04L 67/02* (2013.01); *H04L 67/146* (2013.01)

(58) Field of Classification Search
None
See application file for complete search history.

(56) References Cited

U.S. PATENT DOCUMENTS 7,194,552 B1 *  3/2007  Schneider ........... H04L 61/3015
                                                709/217
7,664,724 B2 *  2/2010  Lucovsky ............. G06F 21/335
                                                707/781

(Continued)

OTHER PUBLICATIONS

Kohlar, Florian; Schwenk, Jorg; Jensen, Meiko; Gajek, Sebastian. Secure Bindings of SAML Assertions to TLS Sessions. ARES '10 International Conference on Availability, Reliability, and Security. Pub. Date: 2010. http://ieeexplore.ieee.org/stamp/stamp.jsp?arnumber=5438111.*

(Continued)

*Primary Examiner* — Jeremiah Avery
(74) *Attorney, Agent, or Firm* — David B. Woycechowsky; David H. Judson; Jeffrey S. LaBaw

(57) ABSTRACT

A technique to reassign one or more stored elements of web application client state information is provided in an HTTP-based client upon receipt of an HTTP redirect in response to a request-URI. One or more stored elements associated to the request-URI are saved in or in association with the client. Upon receipt of an HTTP 301 (permanent) redirect, the client automatically reassigns (re-associates) the one or more stored elements to the redirect domain when the redirect can be verified as authentic (e.g., to originate from the application to which the client is attempting to connect).

14 Claims, 3 Drawing Sheets

Related U.S. Application Data continuation of application No. 14/326,255, filed on Jul. 8, 2014, now Pat. No. 9,426,152.

(56) References Cited

U.S. PATENT DOCUMENTS

| | | |
|---|---|---|
| 8,504,692 B1 | 8/2013 | Henderson |
| 2004/0054898 A1 | 3/2004 | Chao et al. |
| 2005/0204148 A1* | 9/2005 | Mayo ................. H04L 63/0815 713/185 |
| 2006/0056317 A1 | 3/2006 | Manning et al. |
| 2006/0253446 A1 | 11/2006 | Leong et al. |
| 2006/0265508 A1* | 11/2006 | Angel ............... H04L 29/12047 709/230 |
| 2008/0005127 A1* | 1/2008 | Schneider ......... H04L 29/12594 707/999.01 |
| 2008/0120412 A1* | 5/2008 | Icaza ....................... H04L 67/16 709/225 |
| 2009/0031368 A1 | 1/2009 | Ling |
| 2009/0144288 A1 | 6/2009 | Refuah et al. |
| 2010/0070448 A1* | 3/2010 | Omoigui ............. H01L 27/1463 706/47 |
| 2010/0281107 A1* | 11/2010 | Fallows .................... G06F 9/54 709/203 |
| 2011/0209202 A1* | 8/2011 | Otranen ................. H04L 63/08 726/4 |
| 2012/0047577 A1 | 2/2012 | Costinsky et al. |
| 2013/0246846 A1* | 9/2013 | Oyman .................. H04W 4/06 714/18 |
| 2014/0173088 A1* | 6/2014 | Varney ................. H04L 67/289 709/224 |
| 2014/0337954 A1* | 11/2014 | Ahmed .................. G06F 21/41 726/8 |

OTHER PUBLICATIONS

Stihler, Maicon; Santin, Altair Olivo; Marcon, Jr. Arlindo L.; da Silva Fraga, Joni. Integral Federated Identity Management for Cloud Computing. 2012 5th International Conference on New Technologies, Mobility and Security (NTMS). http://ieeexplore.ieee.org/stamp/stamp.jsp?arnumber=6208751.*

* cited by examiner

SECURE TRANSFER OF WEB APPLICATION CLIENT PERSISTENT STATE INFORMATION INTO A NEW DOMAIN

BACKGROUND OF THE INVENTION

Technical Field

This disclosure relates generally to web application security and, in particular, to ensuring secure transfer of a web application's client persistent state information to a new domain upon receipt of an authentic HTTP redirect.

Background of the Related Art

One way that computers interact via networks such as the Internet is using the HyperText Transfer Protocol (HTTP) open standard designed by the World Wide Web Consortium (W3C) and standardized as Internet Engineering Task Force (IETF) RFC 2616. It is an intentionally simple and open protocol that is implemented across many heterogeneous computer systems.

A web application often needs to modify its URL structure, e.g., to point to a new domain. When the web application has active users, however, the modification of URL structure is a troublesome task. The most difficult aspect is making sure that, even if URLs change, user impact is minimal. In particular, it is important that URLs are preserved in user clients (e.g., bookmarks in web browsers, URLs in feed readers and other rich-clients that use REST-based APIs, and the like) and continue to work for at least some transition period following the change. Typically, this goal is achieved by using HTTP redirects (from an old to a new location). There are two (2) main types of redirects: temporary, when the client is instructed to temporarily use another location (e.g., for a login page or a resource), and permanent, when a resource (e.g., a web application's URL domain structure) changes permanently. As is well-known, these redirects are done through HTTP response codes, respectively, an HTTP 302 (temporary) and an HTTP 301 (permanent), which are returned from a web application to a requesting user-agent, such as a Web browser.

The HTTP specification (RFC 2616) defines that on permanent redirection (the HTTP 301) "clients with link editing capabilities ought to automatically re-link references to the Request-URI to one or more of the new references returned by the server, where possible." Practically, however, clients typically ignore (some purposefully) this requirement and do not update their URL references for HTTP 301 redirection. The main reasons for this behavior are usability and security problems. Thus, for example, consider a pay-per-use internet provider (e.g., at an airport or hotel), which providers often send the HTTP 301 redirect code incorrectly. If a browser updates links for this redirection, those links would be permanently changed to the incorrect location (and thus broken). In another example, if a browser updates URIs in response to an HTTP 301, malicious open wireless hotspots or proxies would gain the ability to permanently re-link a user's bookmarks or application URLs, thus expanding the scope of phishing attacks. Because of these and other similar problems, the current default behavior of user-agents is to ignore the RFC and not re-link.

It is also known that, as a result of interactions between a web application and an application server, so-called web application client state information (such as form elements, cookies, passwords and the like) that is associated with the client-application server interaction, is stored. When a web application moves to a new domain (such as indicated via a permanent HTTP redirect), this value of this state information in effect is lost. Users need to enter the information again and/or remove obsolete data stored for the old application server domain. In addition, all persistent cookies that locally cache a user's state information are not reflected in the new server domain. As a consequence, and despite the authenticity of the redirect, the user may have difficulty interacting with the new (redirected) application server domain in an automated and/or seamless manner.

BRIEF SUMMARY

According to this disclosure, a client state information transfer or "reassignment" function is implemented in an HTTP-based web application client upon receipt by the client of an HTTP redirect in response to a request-URI. Typically, the request-URI is associated with an application server domain. Upon receipt an HTTP permanent redirection message, and upon confirming that the message is authentic, the web application client automatically reassigns the client state information (e.g., form elements, passwords, cookies, and the like) to the new application server domain identified in the redirect.

In operation, and upon receipt of a permanent redirect, a client user-agent that has been provisioned to implement the reassignment function determines whether the permanent redirect message is authentic, e.g., whether it is received from the application server domain to which the request-URI was directed. Preferably, this determination is made in one of several ways, e.g., evaluating whether the redirect is received in a trusted SSL connection, whether the redirect is received in a connection that, if not protected by SSL, is otherwise trusted (e.g., because the request-response is being carried out over a corporate network), or even whether a user has, upon receipt of the HTTP redirect, confirmed that reassignment should occur, or the like. In response to a determination that the permanent redirect is authentic, state information stored in the browser and associated with the old application server domain is automatically reassigned (re-associated) at the client user-agent and associated with the new application server domain.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
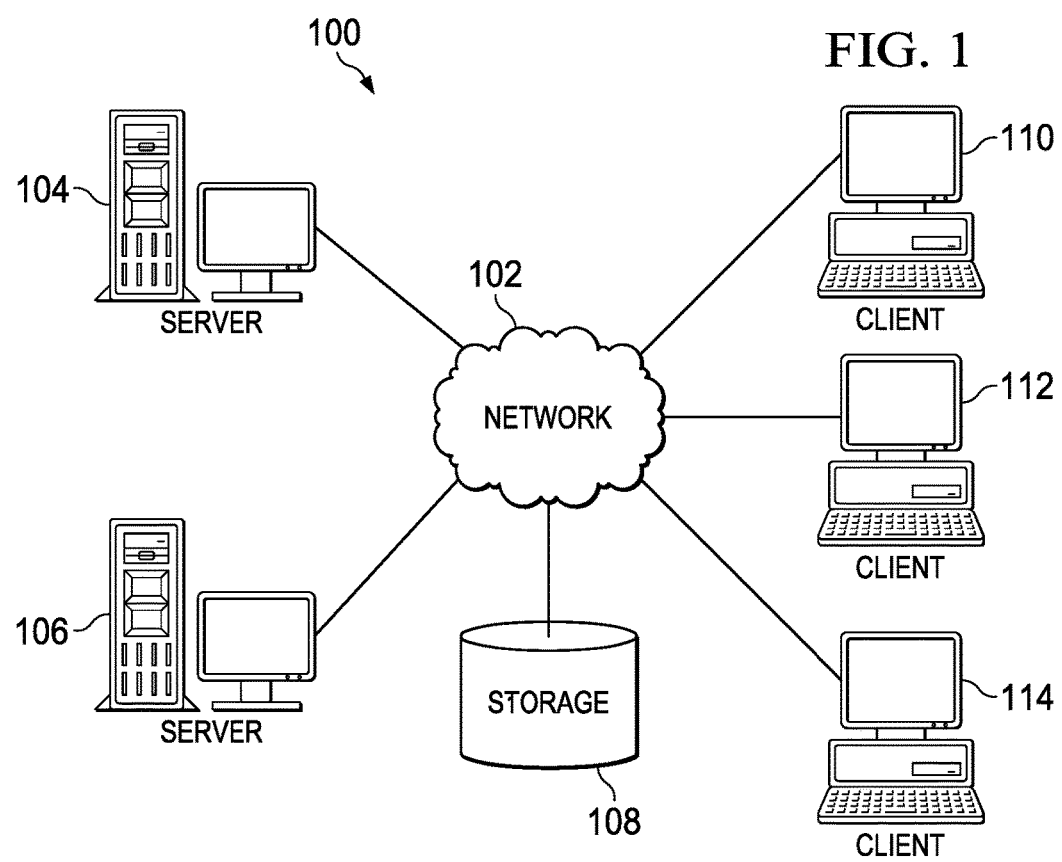
FIG. 1 depicts an exemplary block diagram of a distributed data processing environment in which exemplary aspects of the illustrative embodiments may be implemented.
Figure 2:
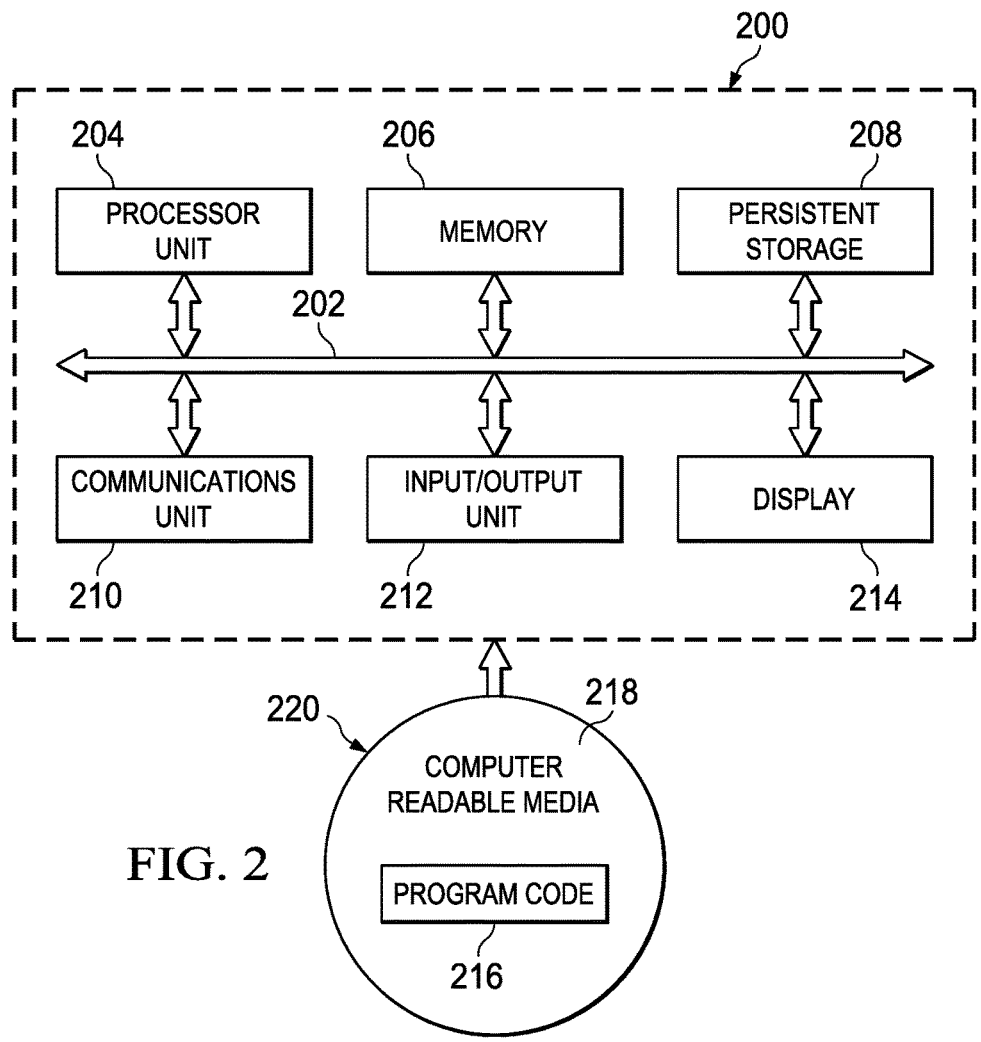
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
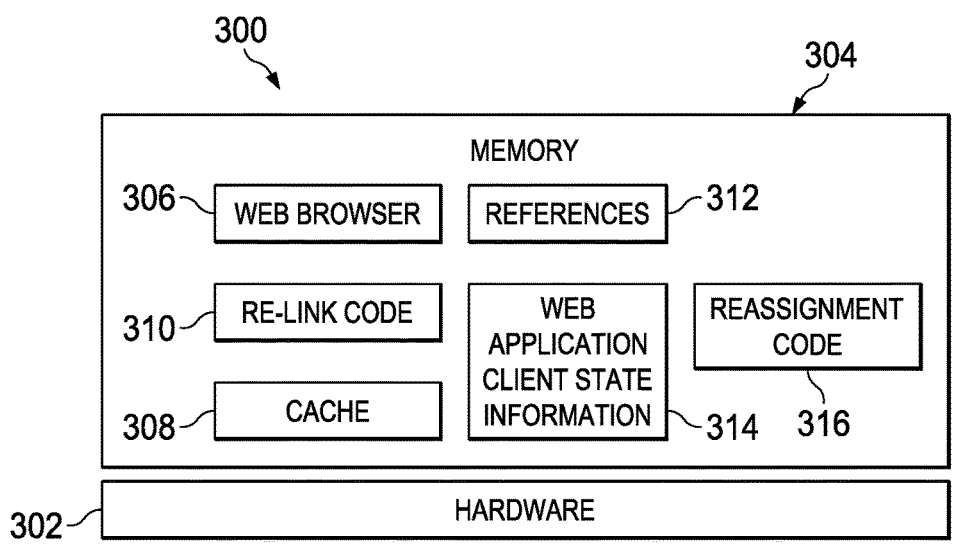
FIG. 3 illustrates a client machine having a user-agent in which the subject disclosure may be implemented.

FIG. 3 illustrates a client in which the subject matter of this disclosure may be implemented. The client 300 comprises hardware 302, memory 304, a web browser or similar user-agent 306, a cache 308, and URL re-link code 310 executed by a processor of the hardware. The URL re-link code 310 includes computer program code that executes a link editing function that also occurs upon receipt of the permanent redirect. A link editing capability refers to the ability of the user-agent to automatically re-link one or more references to the request-URI to one or more new references returned and identified in the redirect. Thus, for example, if the request-URI seeks a resource at //www.content.com/directory/object.jpg and the HTTP response is:

HTTP/1.1 301 Moved Permanently

Location: . . . //www.newcontentdomain.com/directory/object.jpg then the re-link code 310 will update www.content.com to www.newcontentdomain.com and save that new reference 312 (e.g., in the bookmarks file, a list of URLs for a feed reader, other REST-based APIs that reference the original URL, or any other code or data structures that include the original URL for any purpose). More broadly, any system, device, program or process that receives an HTTP redirect and provides a link editing capability may be used for this purpose. A representative but non-limiting implementation is a web browser that includes a link editor function (either natively or via external code).

The client 300 may be implemented as a computing machine such as shown in FIG. 2.

In a typical use case, the user-agent 306 is a web application client that operates in association with an enterprise application server. FIG. 1 illustrates this basic client-application server paradigm. The application server may be supported in an enterprise datacenter or, more commonly, in a cloud compute infrastructure. As is well-known, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

By way of example only, a representative enterprise application of this type deployed in the cloud is a client-server application such as IBM® SmartCloud® for Social Business (formerly LotusLive), which provides a cloud-delivered suite of technologies that combine web conferencing, messaging, and collaboration services with social networking capabilities in an easy-to-use web-based environment. As a component of IBM® SmartCloud, Notes® provides a full-featured email, calendaring, contact management, and instant messaging. A user can access the service directly over the Internet in a number of ways, such as using a web browser, or a "rich" client application (such as the Notes rich client). Using this service, an enterprise places in the cloud service its email, calendar and/or collaboration infrastructure, and a user uses the Notes client to access his or her email, perform a calendar operation, or facilitate an online collaboration. In a representative embodiment, the Notes rich client is Version 8.5.2 or higher.

The above example (using IBM SmartCloud) is merely representative. The techniques described below are not limited for use with a particular enterprise application deployed within the cloud environment.

Moreover, the techniques are not limited to application server(s) that execute in IP-based domains. Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Regardless of the type of client-server technology implemented, it is assumed that that user agent-to-server communications may take place over a secure transport, such as SSL (or TLS, or equivalent) over TCP over IP. This transport is well-known in the art, and it creates an "https session" between the browser and the server. Familiarity with SSL/TLS transport is assumed. The techniques may be used with other secure transport protocols that implement certificate-based cipher suites.

As a result of interactions between the user-agent and the application server, many different types of information are stored in association with the web application. One type of information is user-specific information, such as a user identifier (or other identity) and/or user password. Another type of information includes form elements that are generated by the application server pages and that may be specific to the client. Yet another type of information includes HTTP cookies that are generated by the application server. These cookies typically are persistent. The information is stored in the client (or in association with the client browser) in a data store (e.g., memory 304, cache 308, or other persistent storage). Whether viewed separately or collectively, the information associated with the client-application server interactions is sometimes referred to herein as web application client state information 314, as it reflects the "state" of the client's permitted interactions with the application server.

According to this disclosure, the client 300 is further provisioned with additional program code, which is identified in FIG. 3 as reassignment code 316, which is used to securely reassign (transfer/update) the web application client state information 314, preferably in the manner that is now described.

Secure Transfer of Web Application Client State Information into a New Domain

According to this disclosure, when a user-agent that is provisioned with the above-described state information reassignment capability receives an HTTP 301 permanent redirect, the user-agent automatically determines whether the response message is authentic, e.g., because it originates from the application server domain to which the client is attempting to connect. If the user-agent can verify the authenticity of the HTTP redirect (i.e., it originates from the application server domain to which the client is attempting to connect), one or more stored elements of web application client state information are automatically reassigned to the new domain identified in the redirect. The reassignment is carried out securely and (preferably) in an automated manner, typically using the reassignment code 316 described above (or using separate software functionality, e.g., a plug-in, an applet, an ActiveX control, a script, or the like) that performs the reassignment function. The reassignment may take place in association with a URL re-linking function. The state information reassignment (with or without the URL re-link) may take place during or after the redirection, although preferably it occurs concurrently with the redirect handling as will be described. By reassigning the state information in this secure manner, the HTTP redirection achieves its intended purpose but does not otherwise interfere with stored state information that are otherwise used by the user-agent.

The nature of the reassignment itself will depend on the implementation and, in particular, on the one or more stored elements of the web application client state information. Thus, for example, for passwords or other user identifying information, the reassignment simply updates a password-application server domain association to point to the new domain. For form elements, the reassignment may cause one or more HTML elements to be rewritten, once again to reflect the new domain. In like manner, the text in a cookie that points to the original domain is overwritten to point to the new application server domain.

Figure 4:
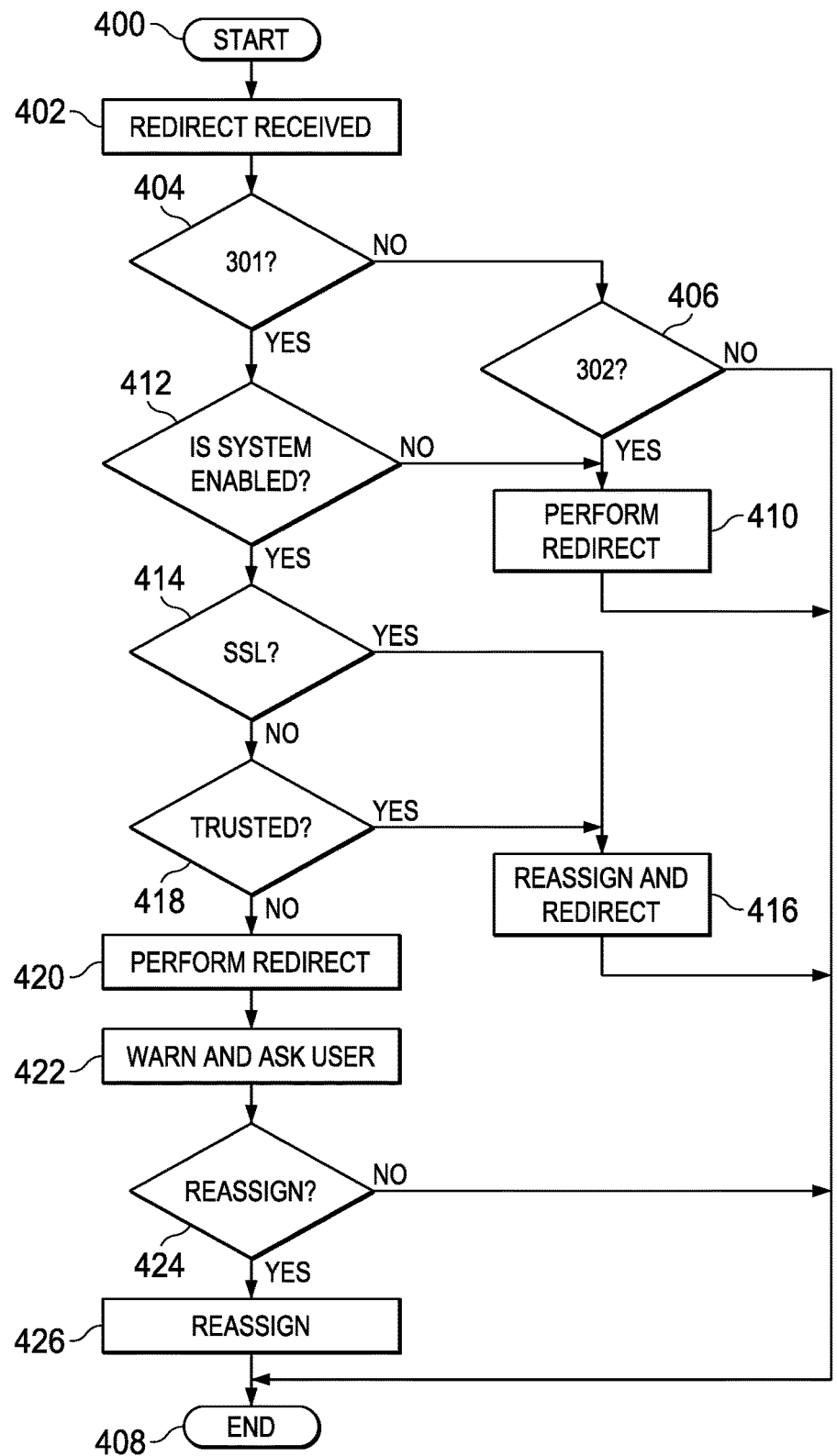
FIG. 4 is a process flow illustrating how the web application client state information reassignment upon HTTP redirect function of this disclosure is implemented in a client user-agent that has been provisioned to perform the function.

FIG. 4 illustrates representative functionality on a client user-agent to implement the state information reassignment functionality. The client may be implemented using the hardware and software described above with respect to FIG. 2. In a typical implementation, and as noted above with respect to FIG. 3, the client comprises hardware, memory, a web browser or similar user-agent, a cache, and reassignment code executed by a processor of the hardware. As noted above, the reassignment code may be implemented in any convenient manner, such as native browser code, as a browser plug-in, an applet, an ActiveX or similar control, as a script, or the like. As has also been described, it is assumed that the client stores or can access the web application client state information.

When the browser establishes an HTTP or HTTPS connection to a target server application (step 400), the operation begins and, in particular, upon receipt by the browser of an HTTP redirect. As illustrated in FIG. 4, this is step 402. At step 404, a test is performed to determine whether the redirect is an HTTP 301 (permanent). If the outcome of the test at step 404 indicates that the redirect is not permanent, control branches to step 406. At step 406, a test is performed to determine whether the redirection is an HTTP 302 (temporary). If the outcome of the test at step 406 is negative, the redirect is neither a 301 nor a 302, and the routine ends at step 408. If, however, the outcome of the test at step 406 indicates that the redirect is a 302 redirect, the routine continues at step 410 to perform the temporary redirect. After the temporary redirect is performed, the routine ends at step 408.

If, however, the outcome of the test at step 404 indicates that the redirect is a permanent one, the routine continues at step 412 to test whether the user-agent is enabled for the web application client state information reassignment functionality of this disclosure. If the outcome of the test at step 412 indicates that the user-agent is not enabled to perform the state information reassignment function of this disclosure, the control branches to step 410 to perform the redirect. As before, after the redirect is performed, the routine ends at step 408.

If, however, the outcome of the test at step 412 indicates that the user-agent is enabled to perform the state information reassignment functionality, the routine continues at step 414 to test whether current request and response are being carried out over SSL (Secure Sockets Layer). If the outcome of the test at step 414 indicates that the communication link itself is SSL-secured between the requesting client and the target server, then the server is trusted and the received HTTP redirect is considered to be authentic. Accordingly, control branches to step 416 to reassign (to the redirect domain) the one or more stored elements of the web application state information. At step 416, and in addition to transferring the one or more stored elements of the web application state information, the routine also performs the redirect itself. Although not shown, during this operation, a URL re-linking operation (to reflect the permanent redirect) may also be carried out. The routine then continues to step 408 and ends. Preferably, the stored elements of the web application client state information are transferred automatically and without further user input (or even active awareness).

While the existence of the SSL connection is one preferred way of determining that the HTTP response is authentic, the determination regarding authenticity of the HTTP redirect may be confirmed in other ways. To that end, if the outcome of the test at step 416 indicates that the communication link itself is not SSL-secured, a test is performed at step 418 to determine whether the communication is otherwise trusted. The HTTP redirect may be considered to have originated from a trustworthy source for one of many alternative reasons (other than being received via SSL), e.g., the client has been authenticated to the server via other means, the client recognizes the network address of the target server, the client recognizes the target server from the contents of an HTTP response header, the target server is associated with a given trusted domain (e.g., an enterprise or corporate network, as opposed to an open WiFi hotspot), or the like. Any such techniques may be implemented. If the outcome of the test at step 418 indicates that the HTTP redirect received is authentic (in other words, that the target server or the connection itself is trusted), then control returns to step 416. As noted above, at this step one or more stored elements of the web application client state information are reassigned and the redirect implemented.

If, however, the outcome of the test at step 418 still indicates that an insufficient proof of authenticity still exists, the routine branches to step 420. At this step the redirect (received at step 402) is implemented (as it must). The routine then branches to step 422 to issue a message to the user that a redirection is taking place; the message also provides a prompt to the user to query whether the user desires to reassign one or more stored elements of the web application client state information. Preferably, the message also provides the user with information about the risk of reassignment or of not reassigning, as the case may be. If the user answers in the affirmative, the routine continues at step 424 to test whether the requested reassignment should take place. Step 424 may by default be answered affirmatively, but it may also implement one or more conditions that have to be met before even the user-approved reassignment occurs. Thus, for example, step 424 may implement a security policy that includes at least one configurable condition that must be met before the user-approved reassignment occurs. This condition may be that the target server's domain is recognized in the security policy, that some temporal condition associated with the request is met, or the like. If the outcome of the test at step 424 indicates that the update should not occur, the routine branches to step 408 and terminates. If, however, the one or more condition(s) specified are met, the routine continues at step 426 to reassign the one or more stored elements. The process then terminates at step 408.

Steps 414, 418 and 424 need not occur in any particular order or sequence. These steps may take place concurrently. Additional tests for determining authenticity of the HTTP redirect (or, in particular, authenticity of the target server that issued the user-agent the HTTP redirect) may be implemented as well.

Additionally, when the redirect comes back in a trusted SSL connection, the browser may still additionally warn and/or disable an update of the web application client state information if there are problems with the SSL connection (e.g., a self-signed certificate or a domain mismatch) even if the user accepts the condition.

A particular redirect that triggers the described functionality is sometimes referred to herein as "protocol-compliant" if it otherwise satisfies the requirements (e.g., syntax, content, style, etc.) required by the protocol.

A particular redirect may include one or more new references. Provided the redirect is verified to be authentic, any stored web application client state information associated with the request-URI is then reassigned to the new domain according to the update techniques described herein.

The following describes an example user scenario. Assume Alice is a user of a web application such as IBM LotusLive® and that this application has recently changed its domain from apps.lotuslive.com (the original domain) to apps.na.collabserv.com (the new domain). Prior to this domain change, Alice has her password and cookies stored in her client and associated with the original apps.lotuslive.com domain. Without knowledge of the domain change, Alice opens her browser to the original domain, e.g., by selecting a bookmark stored in her browser navigation bar. Alice's browser has been provisioned to include the state information update functionality of this disclosure. Her web browser then connects to the bookmarked domain and receives an HTTP 301 permanent redirect to the new domain. Using the above-described functionality (which confirms that the message to redirect is authentic), the browser detects that it has a stored password and cookies for the original domain; it then automatically associates those elements with the new domain (or, alternatively, asks Alice to confirm that the elements should be re-assigned).

The subject matter described herein has many advantages. The technique provides a mechanism to ensure that web application client state information is re-associated with an appropriate application server domain and in a seamless and reliable manner in those clients that include the above-described reassignment capabilities. As described, clients that implement the approach automatically update one or more stored elements of the web application client state information upon receipt of the HTTP 301 redirect. By restricting the state information reassignment to occur only upon receipt of an authentic HTTP redirect, the approach ensures that clients transfer the state information safely and securely. As noted above, the preferred approach is to reassign one or more stored elements of the web application client state information associated with the request-URI to the redirect application server domain when the response can be verified to originate from the application server to which the client is attempting to connect. As noted, if the user-agent can verify the authenticity of the HTTP redirect (i.e., it originates from the application to which the client is attempting to connect), one or more elements of the web application client state information are updated in associated with execution of the redirect itself.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The web application client state information update scheme described herein may be implemented in conjunction with various server-side architectures including simple n-tier architectures, web portals, federated systems, and the like. The techniques herein may be practiced in association with a loosely-coupled server (including a "cloud"-based) environment. As in the example scenario described, the server itself (that issues the redirect) may be hosted in the cloud.

There is no limitation on the precise nature and type of web application client state information that is stored and reassigned according to this disclosure.

The state information reassignment for HTTP redirects according to this disclosure may be implemented in any computing entity that acts as a "client" to another server; thus, the techniques herein are not limited for use for strictly client-side web browser software but may also be implemented, for example, in a server or intermediary process that itself is acting as a client (to some other server component).

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the web application client state information reassignment functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the state information update/reassignment components are implemented in a special purpose computer, preferably in software executed by one or more processors. The software is maintained in one or more data stores or memories associated with the one or more processors, and the software may be implemented as one or more computer programs.

As noted, the functionality need not be implemented in a conventional web browser; the approach may be implemented in a dedicated web app executing in a mobile client device, in a rich client, or the like.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like.

The term "redirect" should be broadly construed to refer to the HTTP specification (RFC2616) or, more generally, any request-response protocol directive (including FTP, SMTP and others) that instructs a client side user-agent to look elsewhere for a requested resource.

Having described the invention, what is now claimed is as follows:

1. Apparatus operating as a client computer, comprising:
a hardware processor;
computer memory holding computer program instructions executed by the hardware processor and operative to:
store, by a browser run on the client computer, a first Uniform Resource Locator (URL) that identifies a first application server domain;
connect, by the browser, in data communication to a first application server domain using the first URL;
receive, by the browser, a redirect command that identifies a second application server domain as a redirect target;
determine whether the redirect command can be verified as authentic; and
securely transfer, by the client browser, persistent state information associated with the client computer from the first application server domain to the second application server domain.

2. The apparatus of claim 1, wherein the computer program instructions operative to provide the secure transfer of persistent state information include computer program instructions operative to associate a stored password and a cookie for the first application server domain to the second application server domain by the client browser.

3. The apparatus of claim 2, wherein the computer program instructions are further operative, prior to associating the stored password and the cookie to the second application server domain, to cause the browser to present a user prompt inquiring whether the stored password and cookie should be associated with the second application server domain.

4. The apparatus of claim 1, wherein the computer program instructions are further operative to determine whether the second application server domain is trusted.

5. The apparatus as described in claim 1, wherein the persistent state information is one of: user identifying information, one or more form elements associated with a page located at the first application server domain, and a cookie generated by the first application server domain.

6. The apparatus as described in claim 1, wherein the redirect command is an HTTP permanent redirect.

7. The apparatus as described in claim 1, wherein the secure transfer is over a Secure Sockets Layer (SSL) communication link.

8. A computer program product in a non-transitory computer readable medium for use in a data processing system as a client computer, the computer program product holding computer program instructions executed in the data processing system and operative to:
store, by a browser run on the client computer, a first Uniform Resource Locator (URL) that identifies a first application server domain;
connect, by the browser, in data communication to a first application server domain using the first URL;
receive, by the browser, a redirect command that identifies a second application server domain as a redirect target;
determine whether the redirect command can be verified as authentic; and
securely transfer, by the client browser, persistent state information associated with the client computer from the first application server domain to the second application server domain.

9. The computer program product of claim 8, wherein the computer program instructions operative to provide the secure transfer of persistent state information include computer program instructions operative to associate a stored password and a cookie for the first application server domain to the second application server domain by the client browser.

10. The computer program product of claim 9, wherein the computer program instructions are further operative, prior to associating the stored password and the cookie to the second application server domain, to cause the browser to present a user prompt inquiring whether the stored password and cookie should be associated with the second application server domain.

11. The computer program product of claim 8, wherein the computer program instructions are further operative to determine whether the second application server domain is trusted.

12. The computer program product as described in claim 8, wherein the persistent state information is one of: user identifying information, one or more form elements associated with a page located at the first application server domain, and a cookie generated by the first application server domain.

13. The computer program product as described in claim 8, wherein the redirect command is an HTTP permanent redirect.

14. The computer program product as described in claim 8, wherein the secure transfer is over a Secure Sockets Layer (SSL) communication link.

* * * * *